United States Patent [19]
Fabian

[11] Patent Number: 5,268,956
[45] Date of Patent: * Dec. 7, 1993

[54] FILM CASSETTE HAVING MARKERS FOR IDENTIFYING AND DIFFERENTIATING IT FROM OTHER CASSETTES

[76] Inventor: Carl E. Fabian, 577 NE. 96th St., Miami Shores, Fla. 33138

[*] Notice: The portion of the term of this patent subsequent to Feb. 23, 2006 has been disclaimed.

[21] Appl. No.: 987,775

[22] Filed: Dec. 9, 1992

Related U.S. Application Data

[63] Continuation-in-part of Ser. No. 915,242, Jul. 20, 1992, which is a continuation of Ser. No. 791,778, Nov. 4, 1991, Pat. No. 5,189,689, which is a continuation of Ser. No. 572,392, Aug. 27, 1990, Pat. No. 5,077,778.

[51] Int. Cl.$^5$ .............................................. H05G 1/28
[52] U.S. Cl. .................................... 378/162; 378/165; 378/166; 378/182
[58] Field of Search ................ 378/162, 165, 166, 182

[56] References Cited

U.S. PATENT DOCUMENTS

| | | | |
|---|---|---|---|
| 4,698,836 | 10/1987 | Minasian | 378/165 |
| 4,953,193 | 8/1990 | Robinson | 378/165 |
| 5,070,248 | 12/1991 | Pesce | 378/182 |
| 5,086,445 | 2/1992 | Fisher et al. | 378/165 |
| 5,189,689 | 2/1993 | Fabian | 378/162 |

Primary Examiner—Paul M. Dzierzynski
Assistant Examiner—Kim-Kwok Chu
Attorney, Agent, or Firm—Ernest D. Buff

[57] ABSTRACT

An X ray film cassette has a marking mechanism whereby unique identification of the film cassette is provided by film exposed therewithin. Plural light-opaque markers mounted in the film cassette provide means for marking the X ray film therein during exposure with an image correlated with a marking on the cassette exterior, thereby indicating the particular cassette within which the X ray film was exposed.

13 Claims, 6 Drawing Sheets

2

FILM CASSETTE HAVING MARKERS FOR IDENTIFYING AND DIFFERENTIATING IT FROM OTHER CASSETTES

CROSS-REFERENCE TO RELATED APPLICATIONS

This application is a continuation-in-part of copending U.S. application Ser. No. 915,242 filed Jul. 20, 1992 which, in turn, is a continuation of U.S. application Ser. No. 791,778 filed Nov. 4, 1991, now U.S. Pat. No. 5,189,689, which, in turn, is a continuation of U.S. application Ser. No. 572,392, filed Aug. 27, 1990, now U.S Pat. No. 5,077,778.

BACKGROUND OF THE INVENTION

1. Field of the Invention

The present invention relates to medical radiography, and more particularly to means for identifying an individual X-ray cassette from among a group of similar cassettes within a given x-ray department.

2. Description of the Prior Art

A radiographic cassette is generally a flat box of rigid construction designed to contain a sheet of x-ray film in a light-proof condition during the time it is to be exposed to x-ray for the purpose of creating a medical radiograph. From time to time the inside of the cassette may become contaminated with a foreign object, dirt particle, ink smudge, etc. This foreign object makes its presence known by causing an undesirable flaw to appear on radiographic films subsequently exposed in that cassette and one normally attempts to locate and clean the defective cassette. However, the defect is situated on the interior of the cassette and most cassettes are normally maintained in their ready condition, loaded with film and sealed against light. To find the contaminated cassette, all cassettes of the same size in the department would have to be opened, unloaded, and inspected. To solve this problem, it has been customary to write identifying indicia on one of the intensifying screens within eadh cassette and record the same indicia somewhere on the cassette exterior. If, for example, one can determine that a defective film bears the identifying indicium "A8A", one would search among all cassettes in that department for the one with the same indicium "A8A", written on the outside, selectively open only that cassette, clean its screens, and return it to service.

In practice, such attempts to correlate flawed film with its source cassette are unsuccessful when the indicia identifying the intensifying saeen are not visible on the corresponding radiograph. This lack of visibility generally results from the fact that such identifying indicia heretofore have been written or mounted to one intensifying screen only and are therefore overexposed or "burned out" in the upper range of exposures often required for medical radiography. Frequently the image of the indicia is not visible on the resulting radiograph. The dynamic range of clinically useful x-ray exposures is about 2000, i.e. the exposure required for a satisfactory radiograph of a large body part may be 2000 times greater than that needed for a small part. Each intensifying screen within the cassette contributes approximately half of the film exposure. As exposure is increased, light emanating from an umnarked screen opposite the identifying indicium is often times sufficient to darken the film by itself and render the image of the identifying indicia invisible. More times than not, indicium placed on one screen only is visible when the radiograph receives a relatively low radiation exposure but becomes progressively invisible as the exposure is increased. In the latter circumstance, isolating a cassette with a flaw is a difficult and tedious task.

Apparatus and methods, including modifications of the film cassette for marking exposed X ray film or radiographs are disclosed, for example by U.S. Pat. Nos. 3,628,864, 3,703,272, 4,465,364, 4,510,392, 4,806,959, 4,383,329, 4,520,497, and 4,768,114. These art teachings do not address the problems presented by overexposure of identifying indicia. Further, no method has been previously described for mounting indicia to both intensifying screens, in opposition to one another, thereby producing a summation image which is virtually immune from such overexposure. Thus remains a need in the art for a method and means for readily differentiating flawed cassettes from numerous cassette candidates in an accurate, reliable manner.

SUMMARY OF THE INVENTION

The present invention provides an X ray film cassette with a marking means whereby unique identification of a radiographic film cassette is provided by film exposed therewithin. Generally stated, two light-opaque markers mounted in the film cassette provide means for marking the X ray film therein during exposure with an image correlated with a marking on the cassette exterior, thereby indicating the particular cassette within which the X ray film was exposed.

In one aspect, the invention provides a radiographic film cassette for exposing a sheet of film to X rays projected along an X ray path by an X ray tube. The cassette includes a cover having an inner surface defining a recess for receiving the film sheet. A base having an inner surface is adapted to close upon the cover, securing the film sheet. The cassette has a first intensifying screen immovably disposed within the recess between the film sheet and the inner surface of the cover. A first marker is fixed to the first intensifying screen and adjacent to the film to intersect a first portion of the X ray path during exposure. The first marker is light opaque. A second marker is fixed to the second intensifying screen adjacent to the film for intersecting a second portion of the X ray path. The second marker is light opaque and has the same external dimensions and shape as the first marker and is so situated within the X-ray path that the first portion is overlapped by the second portion. The film sheet, upon exposure, bears a composite image of both the first and second markers.

In addition, the invention provides an apparatus for installing light-opaque markers on active sides of the two intensifying screens disposed in an X ray film cassette, comprising; first and second markers, each being light-opaque; first and second appliqué sheets carrying the first and second markers, respectively, each of the appliqué sheets having an adhesive surface in contact with an anti-stick protective sheet, adapted for removal to unmask adhesive thereon; and spacing means comprising a spacer sheet having first and second planar surfaces provided with adhesive adapted for temporary contact with the first and second appliqué sheets, respectively, to thereby form a marker installation assembly; whereby disposition of the marker installation assembly on an active side of one of the intensifying screens with the adhesive surfaces unmasked is operative, upon closing the cassette, to adhesively secure the appliqué sheets to the intensifying screens in an aligned condition.

In the cassette identifying system of the present invention, markings situated opposite one another on both screens result in a composite image which is clearly visible on all radiographs exposed in that cassette throughout substantially the entire dynamic range of clinically useful X ray exposures. Identification of each cassette is unique and positive differentiation of flawed cassettes from numerous cassette candidates is readily accomplished in an accurate, reliable manner.

BRIEF DESCRIPTION OF THE DRAWINGS

The invention will be more fully understood and further advantages will become apparent when reference is made to the following detailed description of the preferred embodiment of the invention and the accompanying drawings, in which.

DESCRIPTION OF PREFERRED EMBODIMENTS

Figure 1:
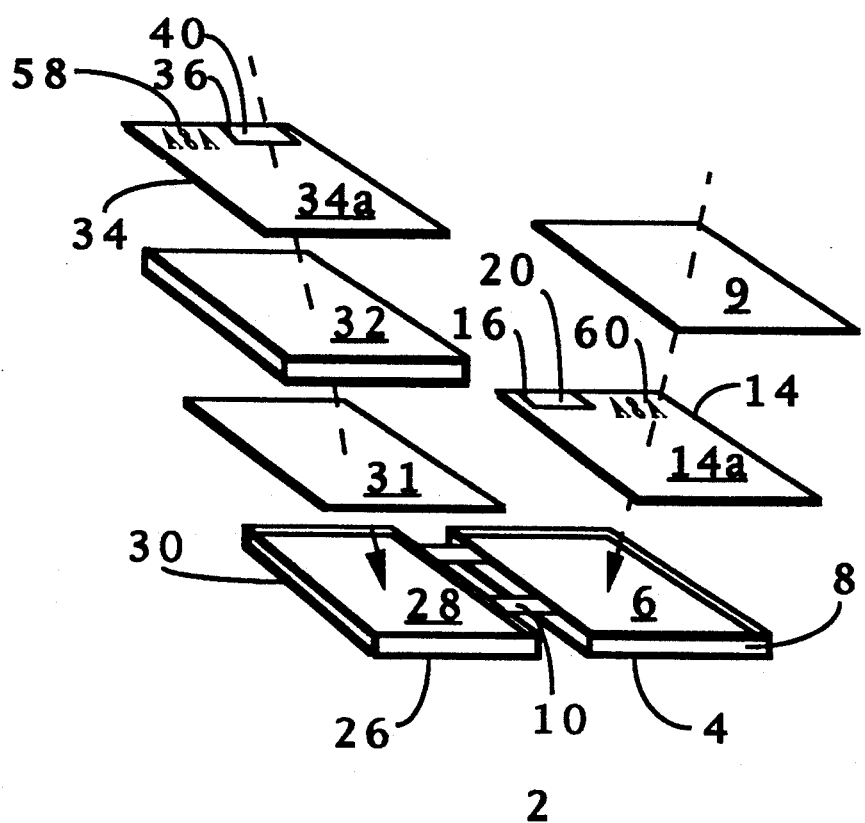
FIG. 1. is an exploded view of an x-ray cassette containing identification indicia comprised of letters, numbers or symbols.
Figure 2:
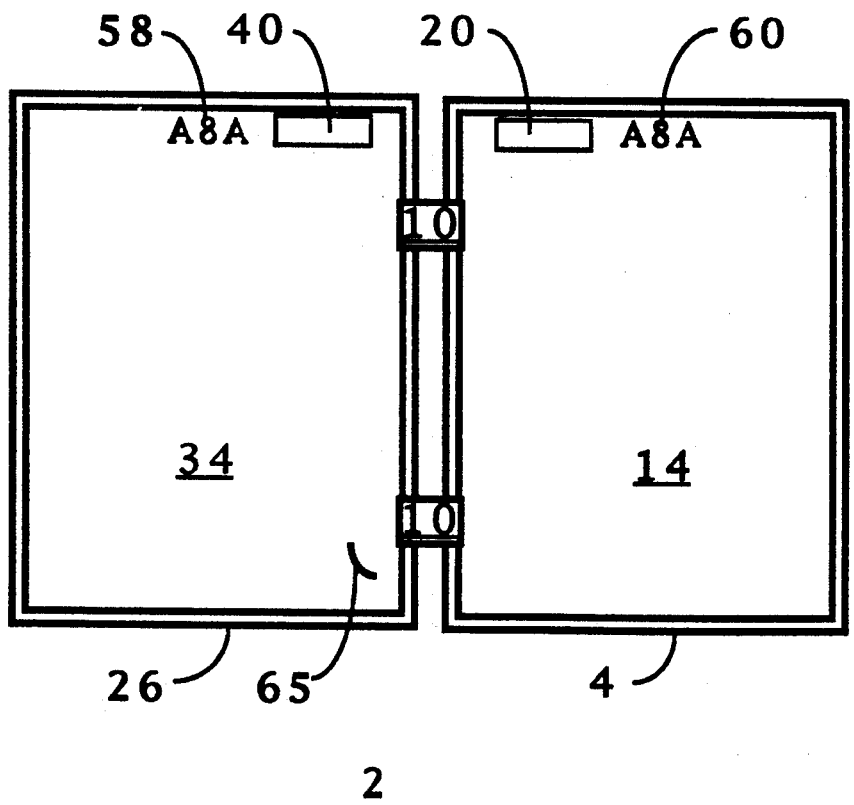
FIG. 2 is a view of an open x-ray cassette equipped with identification indicia on both identifying screens, in opposition to one another, and containing a flaw on one screen having the shape of a crescent.

Referring to FIGS. 1 and 2 of the drawings, there is shown an X ray film cassette 2 having molded cover 4 of aluminum, plastic, or other suitable material which is transparent to X rays and which is of rigid construction. Cover 4 has a flat inner surface 6 and upstanding flanges 8 encompassing the periphery of surface 6 to provide a recess for receiving a sheet of film 9. One or more hinges 10 are mounted along one of the flanges for attaching a base 26. A first intensifying screen 14 having an active surface 14a comprising a fluorescent material is attached to the inner surface 6. The first intensifying screen 14 is provided with a rectangular cutout 16 along one edge to receive X ray opaque blocking rectangle 20. Typically, blocking rectangle 20 comprises lead sheet of approximately 1 inch by 3 inches. A molded base 26 is formed of aluminum, plastic or other suitable material which is of rigid construction. Base 26 has a flat inner surface 28 and upstanding flanges 30 encompassing the periphery of surface 28 to provide a recess for receiving film sheet 9. Flange 30 is connected along one side to hinges 10. A foam pad 32 attached to the inner surface 28 of base 26 carries a second intensifying screen 34 having an active surface comprising a fluorescent material. The second intensifying screen 34 has a cutout 36 provided to receive a second blocking rectangle 40. Typically, blocking rectangle 40 comprises lead sheet of approximately 1 inch by 3 inches. A sheet of lead 31 may be interposed between pad 32 and inner surface 28. Typically, cutout 36 and blocking rectangle 40 are identical to their respective counterparts 16 and 20 in cover 4 and are arranged so that the blocking rectangles 20 and 40 are stacked one over the other when the cassette 2 is closed.

Figure 3:
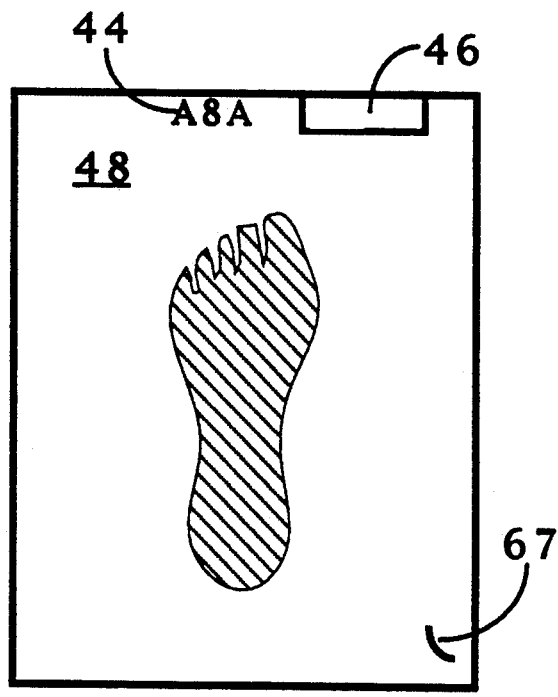
FIG. 3 is a view of an x-ray film exposed in said cassette, containing said identification indicia and marred by said flaw.
Figure 6:
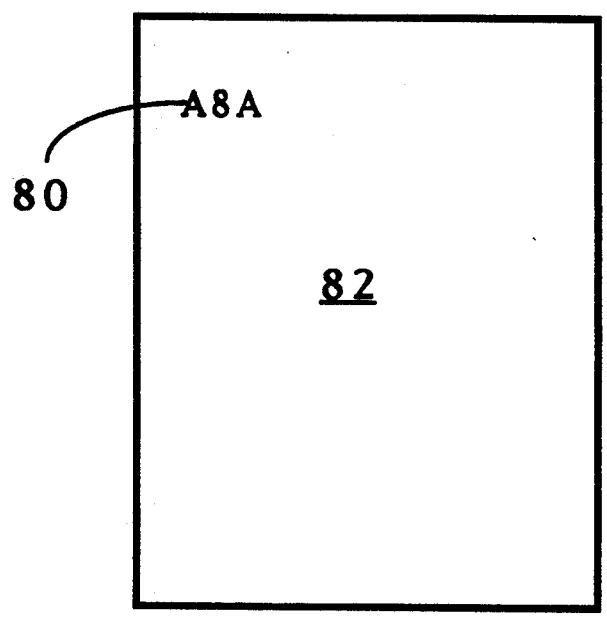
FIG. 6 is a view of an x-ray cassette with external marker.

First marker 60 and second marker 58 are located on intensifying screens 14 and 34, and generally along the edge thereof. Markers 60 and 58 are comprised of light-opaque material, such as black ink, paint, printed decal or similar marking, or X ray opaque lead foil. Cutting away or removing a portion of the intensifying screen in the desired shape would have the same effect. Markers 58 and 60 are alphanumeric characters or other appropriate symbol having the same shape and size, and they are oriented such that they line up one over the other when cassette 2 is closed. The exposed film 48 will bear a composite image 44 of markers 58 and 60, as shown in FIG. 3. Preferably, the cassette 2 has an exterior marker 80, as shown in FIG. 6, fixed to the exterior surface 82 of cover 4 or base 26. Marker 80 is comprised of light-opaque material, such as black ink, paint, printed decal or similar marking. Preferably, exterior marker 80 has the same symbol or character designation as the composite image 44. Alternatively, exterior marker 80 comprises a different symbol than composite image 44 and is correlated to composite image 44 by a cross-reference list.

Alternatively, first marker 60 has a circular, triangular, rectangular, or other shape having external dimensions greater than the alphanumeric or symbol shaped second marker 58. As a further alternative, second marker 58 has a circular, triangular, rectangular, or other shape having external dimensions greater than the alphanumeric or symbol shaped first marker 60.

In practice, different alphanumeric characters or symbols are assigned to different cassettes so that an individual cassette can be identified from a film exposed within that cassette. For example, a radiograph of a left foot exposed in the usual way, through the cover of the cassette, is shown in FIG. 3. When viewed from the front or exposure side of film 48, marker image 44 is formed by markers 58 and 60 blocking exposure of that portion of film 48. Artifact 67 is caused by flaw 65. Blocking rectangle image 46 is also shown in the figures.

Figure 4:
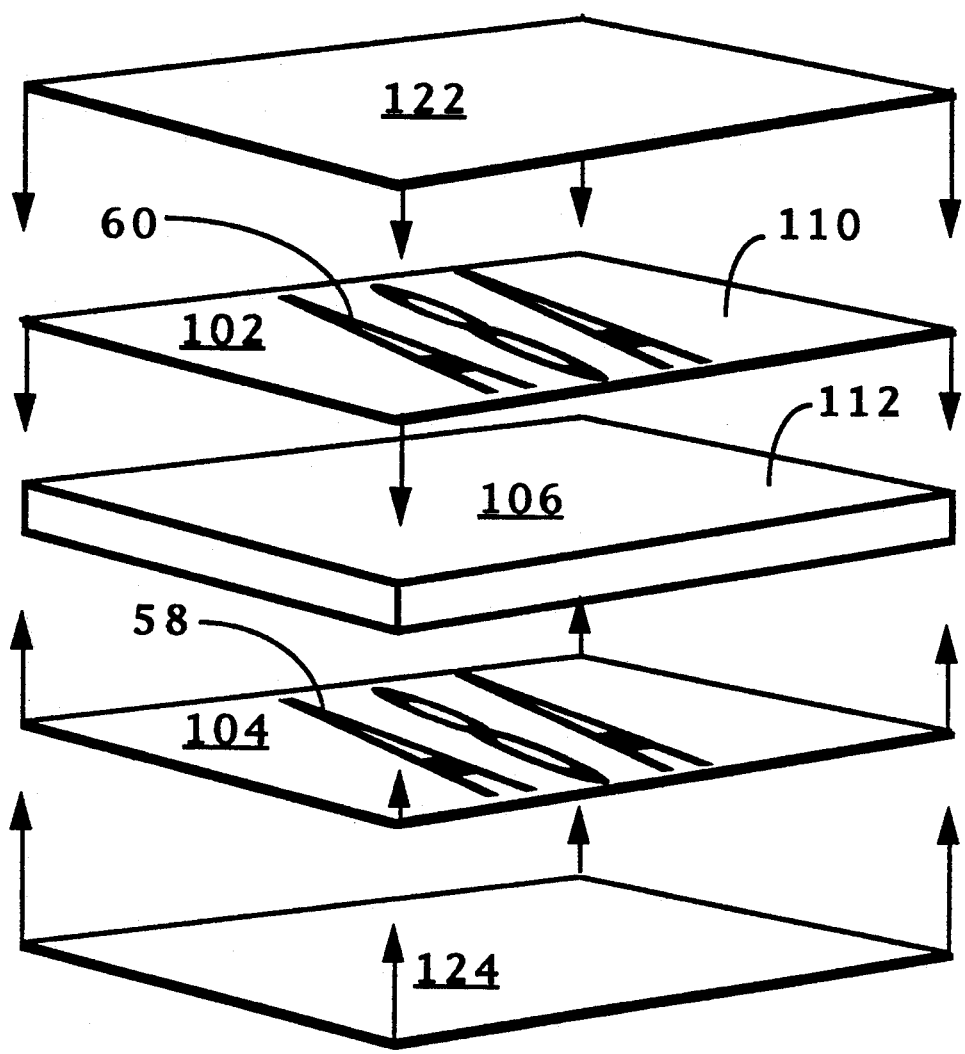
FIG. 4 is an exploded view of apparatus for installing light-opaque identification indicia on both intensifying screens.
Figure 5:
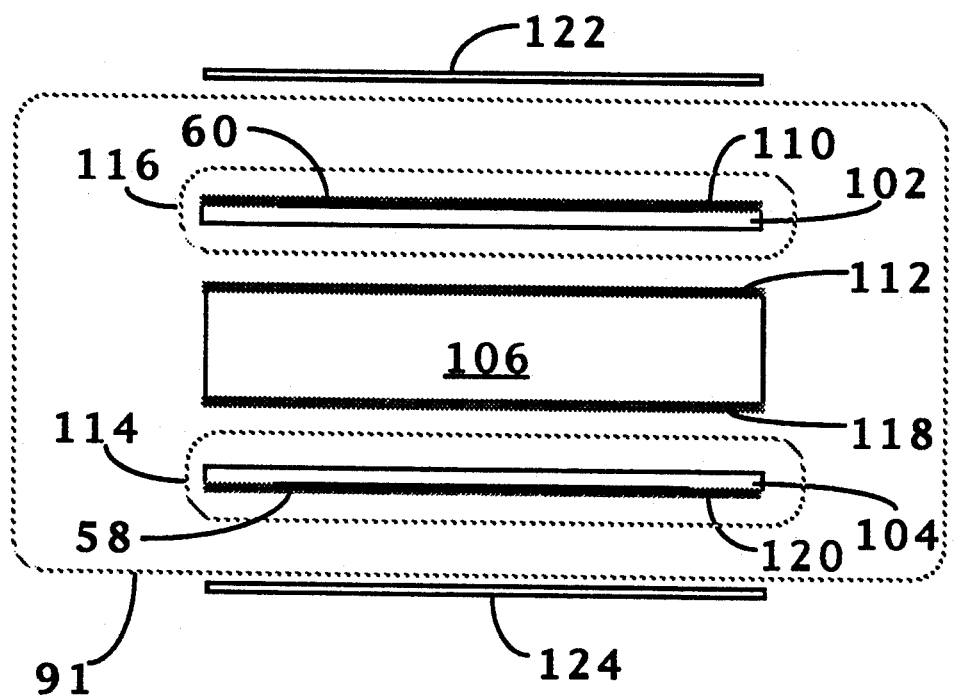
FIG. 5 is a side view of the apparatus shown in Fig. 4.

Shown in FIGS. 4 and 5 is an apparatus 90 to facilitate installation of light-opaque markers 58 and 60 in cassette 2, the apparatus being about ⅛ inch in thickness. Apparatus 90 comprises a marker installation assembly 91 and anti-stick protective sheets 122 and 124. Appliqué 116 comprises light-transparent or translucent sheet 102, light-opaque marker 60, and, adhesive coating 110, such as a pressure sensitive adhesive. Similarly, appliqué 114 comprises light-transparent or translucent sheet 104, light-opaque marker 58, and, adhesive coating 120. Preferably, the adhesive coatings 110 and 120 exhibit clarity and resistance to ultraviolet and X ray aging, such as but not limited to, polyvinyl ethyl ether, polyisobutylene, or acrylate copolymer based coatings. The sheets 102 and 104 are composed of a member selected from the group consisting of cellophane, polyvinyl chloride, polyester, polyethylene, polypropylene, cellulose acetate and similar films. The adhesive coatings 110 and 120 are temporarily protected by the anti-stick protective sheets 122 and 124 respectively. The protective sheets 122 and 124 are comprised of paper or similar web material having anti-stick coatings, such as cured dimethyl silicone or wax. These anti-stick protective sheets 122 and 124 have significantly lower surface energy than the surface tension of the adhesive coatings 110 and 120, and will therefore separate easily from the adhesive coatings. Typically the surface energy of the anti-stick protective sheets 122 and 124 is less than about 80%, preferably less than about 50%, more preferably ranges up to 25% of the surface tension of the adhesive coatings. Spacer 106 is comprised of a disposable material such as paper, cardboard, or foam pad, and the spacer has both faces covered with adhesive coatings 112 and 118. The adhesive coatings 112 and 118 have surface tensions significantly greater than the surface energies of appliqués 114 and 116 respectively, and are thereby adapted to temporarily hold the appliqués. Typically the surface tension of the adhesive coatings 112 and 118 is greater than about 125%, preferably greater than 200%, and more preferably ranges above 400% of the surface energy of the appliqués 114 and 116.

In use of the apparatus 90, protective sheets 122 and 124 are stripped from marker installation assembly 91 and the exposed adhesive surface 120 is pressed against and along the periphery of the active surface 34a of the screen 34 disposed in open cassette 2, until firmly secured. Fully closing and reopening cassette 2 causes appliqué 116 to permanently affix to the active surface 14a of the screen 14, and the spacer 106 to separate at one of its adhesive surfaces 112 or 118, permitting removal and disposal of the spacer 106. Appliqués 114 and 116 are transferred to their respective intensifying screens 34 and 14, and markers 58 and 60 are then lined up exactly one over the other. The above described apparatus represents the preferred manner of installing markers on intensifying screens.

The invention has been described in detail with particular reference to the preferred embodiments thereof, but it will be understood that additional variations and modifications may suggest themselves to one skilled in the art, all falling within the scope of the invention as defined by the subjoined claims.

I claim:

1. A radiographic film cassette for exposing a sheet of film to X rays projected along an X ray path by an X ray tube, comprising:
    (a) cover having an outer surface, and an inner surface defining a recess for receiving said film sheet;
    (b) a base having an outer surface, and an inner surface adapted to close on said cover for securing said film sheet;
    (c) an exterior surface;
    (d) a first intensifying screen immovably disposed within said recess between said film sheet and the inner surface of said cover;
    (e) a first marker fixed to said first intensifying screen and adjacent to said film sheet for intersecting a first portion of said X-ray path during exposure, said marker being light opaque;
    (f) a second intensifying screen immovably disposed between said film sheet and the inner surface of said base;
    (g) a second marker fixed to said second intensifying screen adjacent to said film for intersecting a second portion of said X ray path during exposure, said second marker being light-opaque and being so situated within the X-ray path that the first portion is overlapped by the second portion;
    said film sheet upon exposure bearing a composite image of said first and second markers.

2. A film cassette as recited in claim 1 further comprising a third marker fixed to said exterior surface, said third marker being correlated with said composite image of said first and second markers.

3. A film cassette as recited in claim 1 wherein said first marker and said second marker comprise the same alphanumeric characters.

4. A film cassette as recited in claim 1 wherein said second marker is a mirror image of said first marker and so situated that when said cassette is closed said first and second markers overlap one another.

5. A film cassette as recited in claim 1, wherein said second marker has dimensions greater than said first marker and is so situated within said X ray path that said first portion is overlapped by said second portion.

6. A film cassette as recited in claim 1, wherein said first marker has dimensions greater than said second marker and is so situated within said X ray path that said second portion is overlapped by said first portion.

7. A film cassette as recited in claim 1, wherein one or both of said first and second markers are cutouts in said first and second intensifying screens respectively.

8. A film cassette as recited in claim 1, wherein said second marker has dimensions greater than said first marker and is so situated within said X ray path that said first portion is overlapped by said second portion, and said second marker is a cutout from said second intensifying screen.

9. A film cassette as recited in claim 1, wherein said first marker has dimensions greater than said second marker and is so situated within said X ray path that said second portion is overlapped by said first portion, and said first marker is a cutout from said first intensifying screen.

10. A film cassette as recited in claim 1, further having an alphanumeric marker attached to exterior of said cover or said base.

11. A film cassette as recited by claim 1, wherein the dimensions and shape of each of the first and second markers are the same.

12. A process for individually marking a radiographic cassette having two intensifying screens and an X ray film comprising the steps of: (1) attaching light-opaque markers to both intensifying screens of said cassette in opposition to one another, said markers overlapping a common portion of an X ray path through said film; (2) correlating an image produced on said film during radiographic exposure with a marking on the exterior of said cassette, thereby indicating the individual cassette within which said X ray film was exposed.

13. In a process wherein an appliqué is used to affix a plurality of light-opaque markers to a plurality of intensifying screens adjacent an X-ray film, the improvement wherein each marker is disposed in opposition to one another, overlaps a common portion of an X ray path through said film during radiographic exposure, and upon such exposure produces an image that is correlated with a marking on the exterior of the cassette, thereby indicating the individual cassette within which said X ray film was exposed.

* * * * *